Aug. 10, 1965   W. S. PEASE ETAL   3,199,557
EGGPLANT PARING MACHINE

Filed July 25, 1961   3 Sheets-Sheet 1

INVENTORS.
WARREN S. PEASE
KENNETH R. HEALY
BY

ATTORNEYS

INVENTORS.
WARREN S. PEASE
KENNETH R. HEALY

ATTORNEYS

Aug. 10, 1965     W. S. PEASE ETAL     3,199,557
EGGPLANT PARING MACHINE
Filed July 25, 1961     3 Sheets-Sheet 3
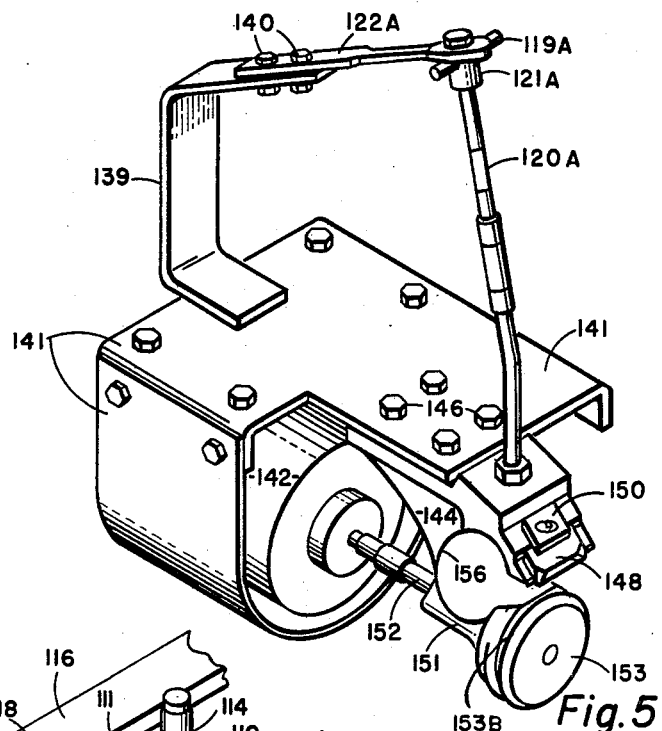
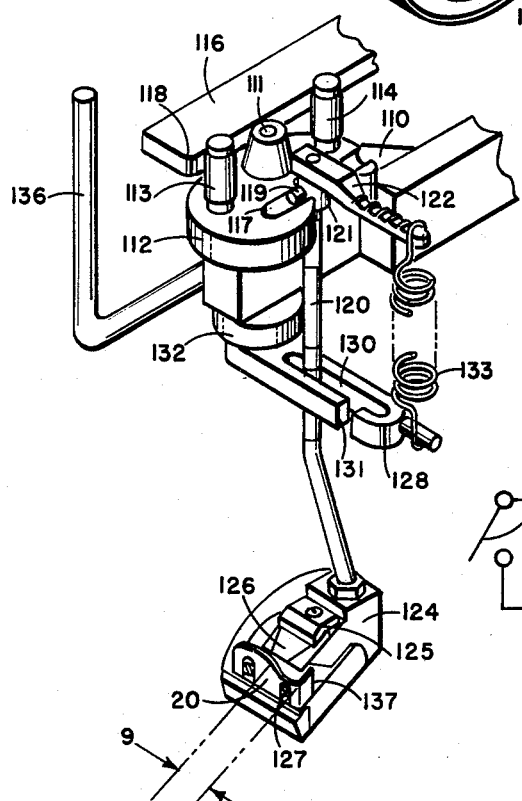
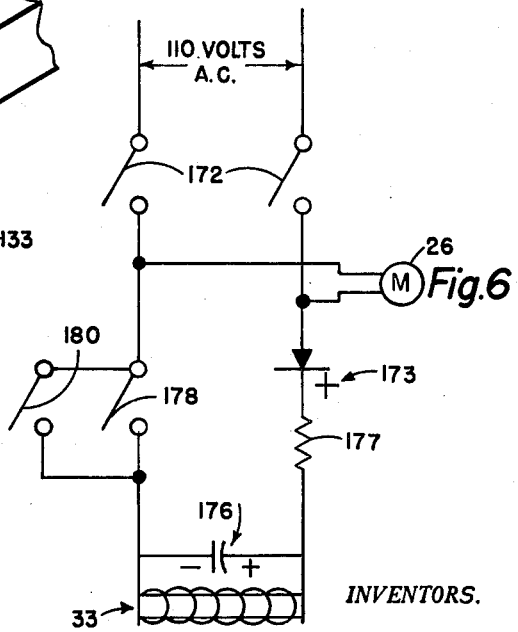
INVENTORS.
WARREN S. PEASE
KENNETH R. HEALY
BY
ATTORNEYS United States Patent Office 3,199,557
Patented Aug. 10, 1965

3,199,557
EGGPLANT PARING MACHINE
Warren S. Pease, Honeoye Falls, and Kenneth R. Healy, Rochester, N.Y., assignors to F. B. Pease Company, Rochester, N.Y., a corporation of New York
Filed July 25, 1961, Ser. No. 126,634
19 Claims. (Cl. 146—43)

This invention relates to methods and apparatus for paring fruit and/or vegetables and more particularly to methods and apparatus for paring eggplants.

For a great many years, there has been a wide variety of different paring machines adapted for paring apples, pears, and oranges but none are adaptable for paring an eggplant.

There has, heretofore, been little demand for a large quantity of pared eggplants for commercial purposes. In recent years, such a demand has arisen. Preceding our invention, eggplants, have been manually pared which has resulted in an economic barrier to the industry. Therefore, it is one object of our invention to provide method and apparatus for more economically paring eggplants.

The eggplant is a fruit readily distinguishable from any of the other fruits heretofore mechanically pared by known methods and apparatus. Because of its shape and rubbery consistency, mechanical paring of this fruit has presented problems setting it apart from most of the fruits heretofore pared by mechanical apparatus.

Therefore, it is one object of this invention to provide method and apparatus for satisfactorily paring eggplants mechanically.

It is a further object of this invention to provide methods and apparatus for spirally paring an eggplant at a substantially uniform rate as the paring blade passes over the contour of the fruit thereby to minimize waste pared from the fruit.

Another object of our invention is the provision of method and apparatus for mechanically paring fruits or vegetables of a rubbery consistency.

A significant object of this invention is to provide apparatus for mechanically paring eggplants in a manner minimizing manual handling thereof.

There are certain features of our method and apparatus that present novelty in the paring of any fruits. One significant feature which is novel as applied to paring any fruit is the use of a rotating blade for increasing the effective paring of fruits.

A further object of this invention is the provision of a simple and inexpensively manufactured apparatus to accomplish all of the above set forth objects.

Other objects and advantages of this invention will be particularly set forth in the claims and will be apparent from the following description of several embodiments of this invention taken in connection with the accompanying drawings in which:

FIG. 4 is an enlarged perspective view of the paring blade supporting structural portion of the embodiment illustrated in FIG. 1 with movable parts in a different position;

FIG. 5 is a perspective view of a second embodiment of a paring blade substitutable for the one illustrated in FIG. 4;

FIG. 6 is a diagram of the electrical circuitry used with the embodiment of this invention illustrated in FIG. 1.

First we shall briefly describe the operation of the illustrated embodiments of our invention and then by numbered headings we shall describe the illustrated embodiments more in detail.

Figure 1:
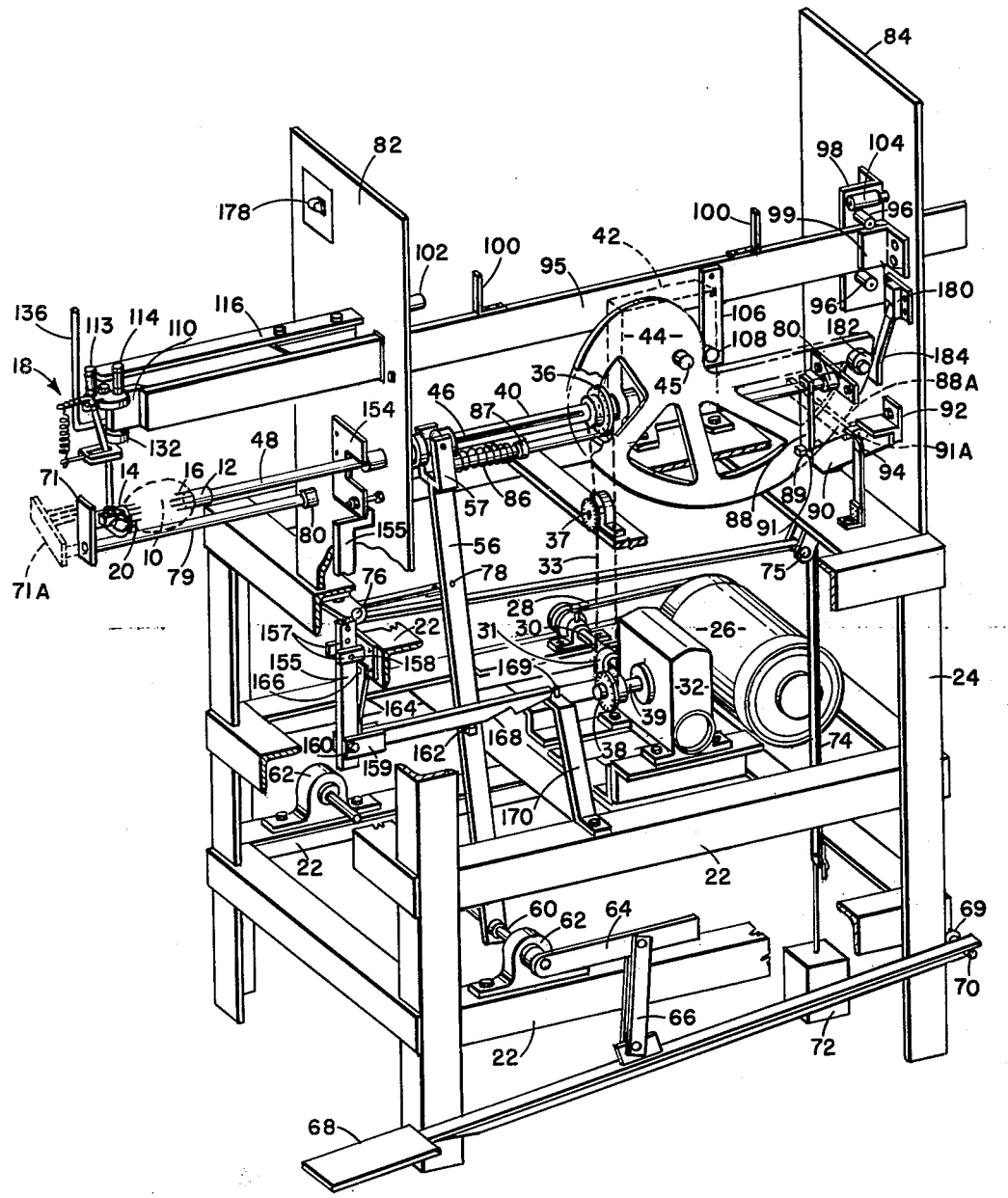
FIG. 1 is a perspective view of one embodiment of our invention.

With reference to FIG. 1, an eggplant illustrated in broken line at 10, is supported in a substantially horizontal position by two spike members 12 and 14 each having spaced prongs or spikes 16 upon which the eggplant 10 has been impaled. The stem and blossom ends are respectively impaled on spike members 12 and 14 along substantially the central longitudinal axis of the eggplant.

A paring blade carriage generally indicated by the numeral 18, supporting a paring blade 20 (see FIGS. 1 and 4) and maintaining the blade in engaged relation with the eggplant, is carried horizontally to the right as viewed in FIG. 1 while the eggplant is simultaneously rotated in a clockwise direction as viewed from the left side of FIG. 1. The movement of the blade and rotation of the fruit are coordinated to spirally pare the eggplant from the blossom end to the stem end at a substantially uniform rate thereby to provide a uniformly spirally pared eggplant.

After the eggplant has been completely pared the eggplant is ejected from spike members 12 and 14 by a device hereinafter described.

For purposes of clarity, the details of the illustrated embodiments of this invention shall be described under the following headings.

(I) Driving means for controlling the rotation of the eggplant and movement of the paring blade.

(II) Means for supporting the eggplant.

(III) Means for carrying the paring blade while paring the eggplant.

(IV) Means for ejecting the eggplant after it is pared.

(V) Detailed description of the operation of the embodiment illustrated in FIG. 1.

*(I) Driving means for controlling the rotation of the eggplant and movement of the paring blade*

Figure 2:
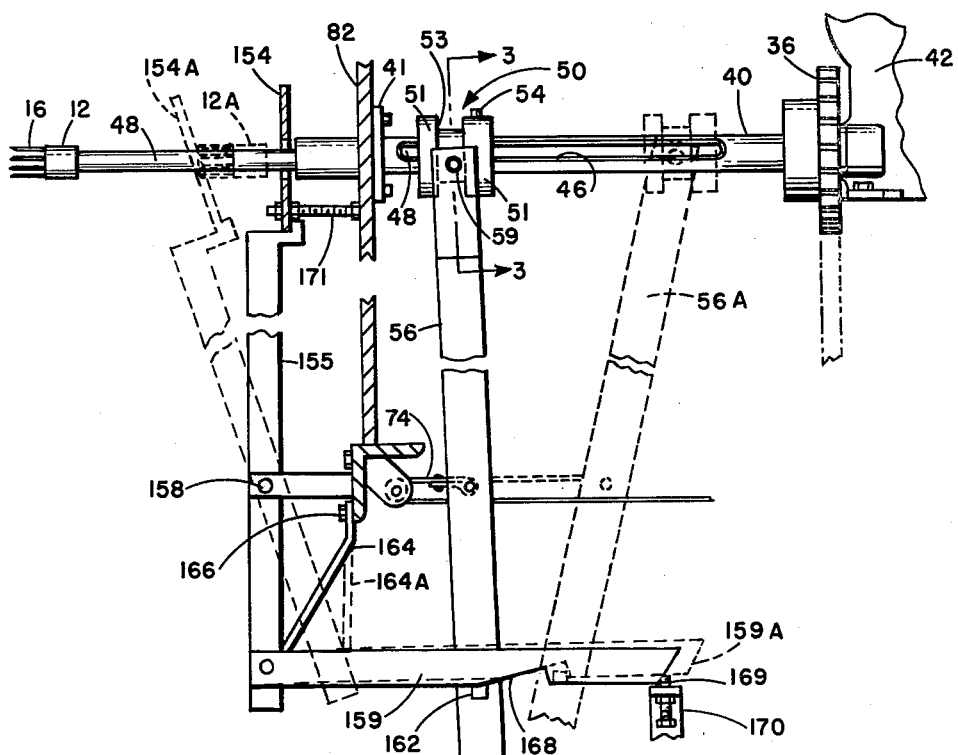
FIG. 2 is an enlarged side elevation of a portion of the embodiment illustrated in FIG. 1 with a second position of the selected parts illustrated in broken lines.

The embodiment of the invention shown in FIG. 2 includes a support frame comprising a plurailty of horizontal right angle support members 22 and a plurality of vertical right angle support members 24 being rigidly mounted together to structurally support the operational parts of the illustrated embodiment. A variable speed motor 26 rigidly mounted to horizontal members 22 of the support frame drives a belt 28 in turn driving a shaft 30. Shaft 30 drives a gear reducer 32 when electrically brought into driving relationship by an electromagnetic clutch 31 intermediate shaft 30 and gear reducer 32. Reducer 32 drives a chain 33 in driving relation with a sprocket 36. An adjustable idler sprocket 37 is provided to maintain the chain 33 taut between the sprocket 36 and a sprocket 38 mounted on a drive shaft 39 being driven by gear reducer 32.

Sprocket 36 is rigidly mounted on a drive shaft 40 having a gear (not shown) rigidly mounted on its right end as viewed in FIG. 1 meshing with a second gear (not shown) inside of a gear reducer 42 provided for the purpose of driving a cam 44 off a shaft 45. Shaft 40 is supported at its right end by gear reducer 42 and at its left end by a bearing 41 (see FIG. 2) rigidly mounted on a vertically disposed support plate 82. Cam 44 is designed to control the horizontal movement of the paring blade carriage 18 and in turn the blade 20, the details of which will be described under III. For paring the average size eggplant, the gear reducer 42 rotates the cam 44 one time for each twenty revolutions of the shaft 40 which rotates the eggplant. One revolution of cam 44 completes a cycle during which one eggplant is completely pared from the blossom end to the stem end and the carriage 18 moved away from the stem and after paring. It will be understood that this ratio may be changed depending upon the size and shape of the eggplant to be pared.

Figure 3:
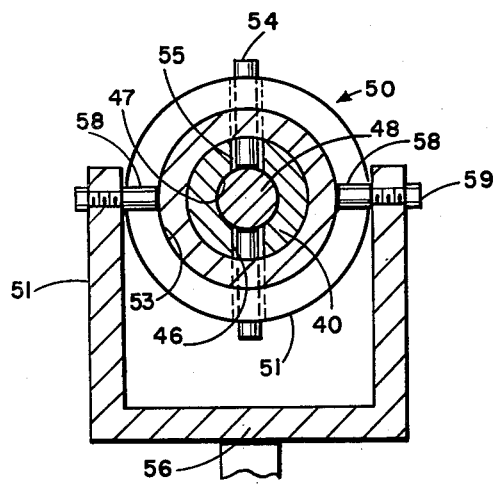
FIG. 3 is an enlarged sectional view taken along the line 3—3 of FIG. 2 looking in the direction indicated by the arrows.

Drive shaft 40 is provided with a slot 46 extending radially through the shaft. Referring to FIG. 3, drive shaft 40 and radial slot 46 are shown in section. Drive shaft 40 is also provided with a longitudinal bore 47 receiving a spindle 48 supporting spike member 12 at its left end as viewed in FIGS. 1 and 2. Spindle 48 is slidably mounted within the bore 47. A flanged collar 50 slidably mounted around shaft 40 has two flanges 51 defining a groove 53 intermediate the flanges. A radial hole 55 is provided in one of the flanges 51 to register with slot 46 of shaft 40 and a radial hole (not shown) in spindle 48 is also provided to register with slot 46. A pin 54 is received in hole 55, slot 46, and the hole (not shown) in spindle 48, thereby providing a driving relationship between the drive shaft 40 through pin 54 to the spindle 48.

According to the above arrangement, collar 50 also rotates with the drive shaft 40. Below collar 50 there is provided a yoke member 56 having arms 57 carrying bolts 59 threaded thereto. Bolts 59 rotatably support rollers 58 received by groove 53 of collar 50. Rollers 58 permit collar 50 to rotate independent of yoke member 56 but does provide a connection whereby collar 50 and spindle 48 connected thereto are slidably controlled along shaft 40 within the limits of slot 46 by the yoke member 56 in the manner illustrated in FIG. 2 broken line. When the yoke 56 is moved to the broken line position illustrated at 56–A the spike member 12 is moved horizontally to the right as viewed in FIG. 2 to the position illustrated in broken line at 12–A.

In this manner, apparatus is provided for driving the cam 44 while rotating the spindle 48 in turn rotating the spike member 12 and eggplant 10 impaled thereon and for moving the spindle 48 horizontally for purposes hereinafter described.

*(II) Means for supporting the eggplant*

Referring to FIG. 1, yoke member 56, controlling the horizontal slidable movements of spindle 48 and spike member 12 mounted thereon, is rigidly mounted at its lower end to a shaft 60. Both ends of shaft 60 are supported in bearings 62 mounted on horizontal members 22 of the frame. Shaft 60 which controls the pivotable movement of yoke member 56 is controlled through a linkage of an arm 64 rigidly mounted on shaft 60 and a link member 66 pivotally connected at both ends intermediate arm 64 and a foot operated treadle 68 which treadle is rigidly mounted at its right end, as viewed in FIG. 1, to a shaft 70 in turn pivotally mounted in a bearing 69. By this linkage, spike member 12 may be moved horizontally from the position 12 in FIG. 2 to the position 12–A illustrated in broken lines in FIG. 2 by depressing the treadle 68.

The depression of the treadle 68 is opposed by a weight or counter balance 72 supported by a strap 74 passing over pulleys 75 and 76 rotatably mounted to horizontal members 22 of the frame. The opposite end of strap 74 is connected to the yoke member 56 as illustrated at 78. It will be understood that the weight 72 is sufficient to maintain spike member 12 in the position illustrated in FIG. 1 during all operations of the described embodiment of this invention except when the treadle 68 is manually depressed.

Spike member 14 is rotatably mounted on a vertical support member 71 thereby permitting rotation of the eggplant 10 as the spike member 12 is rotated by an apparatus described under I above.

Support member 71 is retractably and pivotally movable in a counter-clockwise direction to the broken line position illustrated at 71–A by means hereafter described.

In operation, spike member 14 is initially moved to the broken line position 71–A. The operator manually depresses the treadle 68 thereby retracting the spike member 12 to the right as illustrated in FIG. 1 and impales the stem end of the eggplant on the spike member 12. The operator then pivots the support member to which spike member 14 is attached in a clockwise direction from the broken line position 71–A to the solid line position. The operator then elevates the treadle 68 while guiding the blossom end of the eggplant centrally onto the spikes 16 of spike member 12, thereby impaling the eggplant at both ends to substantially horizontally support the eggplant.

While we have elected to illustrate the movable support member 71, it will be understood that it is clearly within the conception of this invention to maintain the support member 71 in a stationary position for impaling the blossom end of the eggplant as the treadle is elevated and the spindle 48 is moved horizontally to the left as viewed in FIG. 1.

The illustrated movable support member 71 is rigidly mounted on the left end of a rod 79 which is rotatably and slidably supported in bearings 80. Bearings 80 are rigidly connected to horizontally disposed support plates 82 and 84. Rod 79 is biased to the right in FIG. 1 by the force of a compression spring 86 bearing against the inner face of the support plate 82 (the bearing surface of which is not shown) and a collar 87 rigidly mounted on rod 79.

There is an arm 88 rigidly mounted at substantially the right end of rod 79. When support member 71 is in the solid line position, arm 88 is received in a notch provided by a block 89 rigidly mounted to plate 84 and a diagonally extending vertically disposed track 90 spaced from and rigidly connected to plate 84 as illustrated in the solid line position. When the support member 71 and rod 79 are retracted to the left in opposition to spring 86, arm 88 is forward of the face of track 90. As support member 71 is pivoted toward the broken line position 71–A, a roller 91 travels over the face of track 90 in a counter-clockwise direction until arm 88 reaches the broken line position 88–A corresponding to the broken line position of member 71–A. At the extreme counter-clockwise position of 91–A, this roller is secured between a stop 92 and a resilient catch 94.

The last described structure, providing a retractable, pivotable support member 71 for the spike member 14, provides apparatus convenient for withdrawing the spike member 14 from any interfering position during the impaling of the stem end of the eggplant on the spike member 12.

*(III) Means for carrying the paring blade while paring the eggplant*

This embodiment of this invention includes the paring blade carriage generally indicated by the numeral 18 comprising an elongate rectangular cross-section member 95 slidably supported by two pairs of rollers 96 (only one pair of which is illustrated in FIG. 1). Rollers 96 are rotatably mounted to right angle members 98 rigidly mounted to support plate members 82 and 84. Elongate member 95 is guided at either end between right angle member 98 and a right angle member 99 rigidly mounted to each of the support plates 82 and 84. Elongate member 95 is provided with stops 100 controlling the maximum movement of member 95 between two resilient abutments 102 and 104 rigidly mounted to support plates 82 and 84.

Horizontally disposed elongate member 95 is provided with a vertically disposed arm 106 carrying a follower roller 108 rotatably mounted thereon. Roller 108 is engaged by the cam 44, the periphery of which constitutes a curve generated by the variable rate of lineal travel which a paring blade makes while traveling at the selected uniform rate of travel over the surface of a typical eggplant from the blossom end to the stem end. Approximately twenty revolutions of the eggplant will provide a completely pared typical eggplant when the blade 20 is moved at a uniform rate across the irregular contour of the eggplant 10 from the blossom end to the stem end. The exact ratio of twenty revolutions of the eggplant to one of the cam is not essential to our invention.

By designing a cam of the above described selected contour, waste of the eggplant during paring is minimized. Moving the blade 20 at a uniform rate across the contour of the eggplant substantially eliminates duplication of paring across the same portion of the periphery of the eggplant. The curve is derived from first plotting on a straight horizontal line extending the total lineal distance that is desirable to move the blade horizontally. Then plot a curve having its terminal points on a line parallel to the straight line. The curve comprises a portion conforming to the contour of one-half of the typical eggplant plus any additional lineal travel that is desired for the blade to make after completion of the paring of the eggplant itself. Then, the portion of the curve conforming to the contour of the eggplant is divided into equal parts corresponding in number to the revolutions during which paring is to be completed. The additional lineal travel is then divided equally into that number of parts corresponding to the remaining revolutions of the eggplant not being used for paring. Lines are drawn vertically from the points measured along the contour of the curve to the straight horizontal line. The irregular distances measured along the straight horizontal line are then plotted radially about a point which is the rotational axis of the cam 44 thereby generating the desired curve.

Referring to FIG. 4, the paring blade carriage 18 includes an extension 110 which is offset rigidly mounted on the left end of elongate member 95. A rod 111 pivotally mounted in a hole (not shown) in extension 110 is rigidly attached at its upper end to a horizontally disposed support member 112 and at its lower end to a slotted guide 128. Thus member 112 and guide 128 move together. Support member 112 pivotally carries two vertically disposed rollers 113 and 114 adapted to engage a track 116 rigidly mounted to support plate 82. (See FIG. 1.) Support member 112 is provided with a groove 117 receiving pins 119 rigidly attached on opposite sides of a sleeve 121. A shaped rod 120 being pivotally supported within sleeve 121 carries an arm 122 rigidly connected thereto. At the lower end of rod 120, there is a blade carrier casting 124 rigidly mounted thereto. For purposes of illustration, we have shown casting 124 turned 90° counter-clockwise from its operative position. A guide 126 is adjustably mounted to casting 124 by a fastener 125. Guide 126 follows the contour of the fruit and limits the cutting depth of blade 20. Blade 20 is adjustably mounted to casting 124 by two bolts 127.

Slotted guide 128 has a slot 130 adapted for receiving and guiding the pivotal movement of the rod 120. An opening 131 provides access to slot 130.

Slotted guide 128 is spaced from extension member 110 by an adjustable eccentric 132. Eccentric 132 provides an adjustment for the positioning of the rod 120 to prevent the blade 20 and casting 124 from being carried into an interfering position with spindle 48 or spike members 12 and 14. A tension spring 133 is provided between arm 122 and slotted guide 128 for maintaining rod 120 in an engaging position with eccentric 132 and in turn maintaining the blade 20 in engaging relation with the eggplant being pared. Rod 120 pivots in sleeve 121 within a range permitted by spring 133 to more accurately follow the contour of the fruit.

As a matter of convenience, this embodiment includes a handle 136 rigidly mounted to extension 110 for manually moving the paring blade carriage 18 to the left as viewed in FIGS. 1 and 4. The operator may conveniently return the carriage 18 to the position illustrated in FIGS. 1 and 4 by means of handle 136 just before paring commences.

It is one of our discoveries that the particular configuration of the blade 20 illustrated in FIG. 4 more effectively pares an eggplant. The contour of the blade having at least the trailing end disposed angularly preferably substantially normal to the cutting edge of the blade and away from the fruit to be pared, such as shown at 137 in FIG. 4, thereby severing the initially pared skin from the fruit itself, which in the described arrangement would occur at the blossom end. Commonly it has been a problem for parings of mechanically pared fruit to remain on the fruit after being pared because the start of the peeling was not completely severed. It will be understood that it is desirable to provide two such angularly disposed ends thereby guaranteeing severance of the peeling at both ends of the fruit being pared.

Additionally, we have discovered that when a straight blade is used, satisfactory paring can only be accomplished by providing a cutting edge on the blade being angularly disposed, in all positions as it travels over the fruit, with respect to a plane extending through the axis of rotation of the fruit and preferably with the cutting edge of the blade facing away from the direction of travel of the carriage and blade and with the leading end of the blade projecting out of the fruit. While this feature of our invention contemplates the use of a straight edge blade and tilting the casting 124 by introducing the correct angulation into rod 120, we have illustrated the preferred embodiment of blade 20 by maintaining the forward edge of casting 124 parallel with the axis of rotation of the fruit and providing the desired angle into that portion of the blade itself extending between the lines indicated by the arrows 9 of FIG. 4.

In FIG. 5, we have illustrated a second embodiment of the paring blade presenting considerable novelty in the art of mechanical paring of fruits. It is the discovery of these inventors that by rotating the blade about an axis extending through the center of a circular blade that there is substantially no tearing between the fruit being pared and the skin being removed and requires considerably less force in rotating the fruit, thereby increasing the efficiency of the mechanism and minimizing any undesirable tearing as the skin is pared from the fruit. Portions of the structure in FIG. 5 are similar to those illustrated in FIG. 4 in that there is a rod 120–A corresponding in design and function to that illustrated in FIG. 4 at 120. Likewise, rod 120–A is pivotal within sleeve 121–A, thereby permitting the cutting blade to better follow the contour of the fruit. These parts are respectively adapted for being received in slot 130 and the groove 117 of the apparatus of FIG. 4. Thus, it is easy to visualize that this embodiment of the rotating blade is readily adaptable for use with the remainder of the apparatus heretofore and hereafter described.

Rod 120–A is provided with an arm 122–A corresponding to the arm 122 illustrated in FIG. 4. A brace 139 is rigidly mounted by bolts 140 to arm 122–A at its upper end and rigidly mounted, as for example by welding, to a motor frame 141 structurally supporting a motor 142 rigidly mounted thereon. The lower end of rod 120–A is rigidly mounted to a casting 144 in turn rigidly mounted by four bolts 146 to the motor frame 141.

A blade guide 148 functioning in the same manner as guide 126 of FIG. 4 is secured to the casting by a fastener 150. The lower part 151 of the casting 144 is provided with a bore (not shown) extending longitudinally therethrough for receiving a drive shaft 152 driven at its left end by motor 142; releasably mounted at its right end, is a circular blade 153 being driven thereby. Blade 153 has a cutting edge 153–B. Thus, the blade 153 rotates about an axis, comprising the drive shaft 152 lying in a plane extending substantially radially of the axis of rotation of the eggplant.

Casting 144 includes an angular chute 156, extending from the space between the guide 148 and rotating blade 153, downward and to the left, for reeciving and discharging parings as the skin is severed from the fruit. This particular embodiment greatly enhances the paring of fruits and more particularly fruits of the nature of the eggplant having a rubbery consistency.

(IV) *Means for ejecting the eggplant after it is pared*

Referring to FIG. 1, the ejector comprises a partial collar or "C"-shaped member 154 surrounding spindle 48 mounted on an ejector arm 155, the right hand edge of partial collar 154 does not extend beyond spindle 48, thereby eliminating any possibility of interference with blade 20 as it is moved past collar 154 in arriving at its extreme right hand position. Ejector arm 155 is pivotally mounted on a pin 158 being supported by two frame extensions 157 rigidly mounted to a horizontal member 22. At the lower end of ejector arm 155, we have provided a catch or hook 159 pivotally mounted thereto by means of a bolt 160. Catch 159 rides on a square or polygonal cross-section stud 162 rigidly mounted on yoke member 56. A resilient bias member 164 rigidly mounted at its upper end to a horizontal member 22 of the frame, as for example by a bolt 166, engages at its lower end the arm 155, thereby opposing counter-clockwise pivotal movement of arm 155 as viewed in FIG. 1 about the pivot pin 158.

As the treadle 68 is depressed by the operator and the yoke member 56 is pivoted in a clockwise direction as viewed in FIG. 2, the stud 162 catches in a notch 168 of catch 159 and carries the catch to the right, thereby pivoting the ejector arm 155 and attached collar 154 in a counter-clockwise direction as viewed in FIG. 2. Simultaneously, the spindle 48 is retracted to the right until the partial collar 154 has been carried beyond the ends of spikes 16 of spike member 12 thereby ejecting the eggplant being supported on spike member 12, which occurs at a position beyond that illustrated in FIG. 2 of the parts in broken lines. As the catch is carried to the right, it rides upwardly on an adjustable bolt 169 rigidly carried by a support member 170 in turn connected to the frame, thereby releasing the catch which is returned to the solid line position by bias member 164.

We have designed this apparatus so that the catch is released before the yoke member 56 reaches the extreme right end of its stroke, thereby guaranteeing the release of the catch from the stud. Bias member 164 returns the ejector arm 155 and attached collar 154 to the solid line position illustrated in FIGS. 1 and 2. There is provided an adjustable stop 171 which determines the normal position of the ejector arm 155 illustrated in solid line.

(V) *Detailed description of the operation of the embodiment illustrated in FIG. 1*

Referring to FIG. 6, we have shown the simple electrical circuitry by which this embodiment of this invention is controllable. At 172 we have illustrated a double throw main switch across a 110 volt A.C. line. The motor 26 is across the line. At 173 we have provided a rectifier for modifying the A.C. current to D.C. current for controlling the electro-magnetic clutch 33 illustrated in FIG. 1 for engaging and disengaging the drive shaft 30 with the gear reducer 32. We have also provided a capacitor 176 across the line and resistance 177 in series with the circuit.

In FIG. 6 we have diagrammatically illustrated a normally open starting push button switch 178 by which the circuit is completed to actuate the electro-magnetic clutch 33. Normally closed micro-switch 180 is opened by a roller 182 (see FIG. 1), mounted on the cam 44 engaging control lever 184 connected to micro-switch 180. Normally closed switch 180 is opened at the end of a paring cycle, thereby disengaging clutch 33. In FIG. 6, switches 178 and 180 correspond to the position of the apparatus illustrated in FIG. 1 with the roller 182 engaging lever 184 thereby maintaining switch 180 in the open position. When the operator wants to start the apparatus, the starter button switch 178 is depressed and maintained in the depressed position until cam 44 has turned clockwise a sufficient distance to free the roller 182 from lever 184 and close normally closed switch 180, thereby closing the circuit. Switch 180 completes the circuit until the roller 182 once again engages lever 184 at the end of the paring cycle.

With reference to FIG. 1, in operation the support plate 71 and attached spike member 14 are initially in the broken line position illustrated at 71-A, and the carriage 18 remains at its extreme right hand position (not shown) in which position it is stopped at the end of a cycle. In its extreme right hand position, blade 20 and casting 124 substantially abut plate 82 and lie behind or to the right of both spike member 12 when retracted and collar 154. This eliminates any interference by parts with the operator's actions when impaling the eggplant on spike member 12.

The operator depresses the treadle 68 and impales the stem end of the eggplant on the spikes 16 of spike member 12 while being maintained in the retracted position at the extreme right substantially as illustrated in broken lines in FIG. 2. The support member 71 and the attached spike member 14 are then pivoted in a clockwise direction and permitted to slide forward to the solid line position illustrated in FIG. 1 where they are maintained by the compression spring 86 surrounding the shaft 79. The treadle 68 is then elevated by the operator permitting the operator to impale the blossom end of the eggplant on the spike member 14 as the eggplant is moved horizontally to the left as viewed in FIG. 1 by sliding motion of spindle 48. Thus, the spring 86 and the weight 72 maintain the spike members 14 and 12 respectively in the solid line position applying opposing forces along the horizontal central axis of the eggplant 10.

The stem end is impaled on the spike member 12 because the stem end of an eggplant has a woody portion overlying the skin of the eggplant thereby providing a very solid material whereby the rotating force of the spindle 48 may be transmitted through the eggplant with minimum difficulty. The blossom end does not have a woody portion which presents difficulties in transmitting the rotational force of the spindle 48 through the meat of the fruit without severing the central portions of the fruit between the spikes 16.

The operator will then, by means of force applied in a left-ward direction to the handle 136, move the carriage 18 to the position illustrated in solid line in FIG. 1 ready to commence paring of the fruit.

The operator then depresses the button 178 to complete the circuit illustrated in FIG. 6. When the circuit is completed, the spindle 48 and cam 44 are simultaneously rotated with the spindle 48 making the selected number of revolutions, preferably 20 revolutions, for each revolution of the cam 44. As the cam 44 revolves in a clockwise direction the follower roller 108 actuates elongate member 95 and the entire carriage 18 to the right thereby carrying the blade 20 over the surface of the rotating eggplant.

As the carriage 18 is carried forward from the initial position illustrated in FIG. 1, roller 113 passes over the contour of the track 116 and the support member 112 is rotated 90° around the corner 118 of the track 116.

In this manner, substantially the entire eggplant is spirally pared at a uniform rate and upon reaching the stem end after completion of the paring of the eggplant, the cam 44 moves the carriage 18 and the blade 20 to the right beyond the spike member 12 until roller 182 mounted on cam 44 engages lever 184 and opens micro-switch 180 thereby opening the circuit illustrated in FIG. 6 and stopping the machine.

It will be understood that automatic apparatus could have been provided for returning the carriage 18 to the initial position illustrated in FIG. 1.

After the fruit is pared, the treadle 68 is depressed thereby moving the spindle 48 to the right as viewed in FIG. 1. The blossom end of the eggplant is thus released from the spike member 14, since only the fleshy part of the meat is being retained on spikes 16 of member 14, whereas the woody portion overlying the stem end of the eggplant is adequate to maintain the eggplant on spike member 12 in accordance with the apparatus described under IV above. The collar, 154, in coordinated timing with the movement of spindle 48 ejects the eggplant from the spike member 12 only after the eggplant is free of spike member 14 by engaging the stem end and ejecting it from the spikes thereon. Thereafter the operator may manually pivot the support member 71 and attached spike member 14 back to the initial position illustrated in broken line at 71-A at FIG. 1. The apparatus is then ready for another cycle for paring an eggplant.

While we have shown and described the preferred form of mechanism of our invention it will be apparent that various modifications and changes may be made therein, particularly in the form and relation of parts, without departing from the spirit of our invention as set forth in the appended claims.

We claim:

1. A method for paring fruits and vegetables having a blossom end and a stem end with a woody portion overlying the fruit comprising the steps of supporting said fruit at both the blossom and stem ends on a pair of axially aligned spike members having a plurality of radially spaced spikes received internally of said fruit, rotating said fruit axially at a selected speed, maintaining a paring blade in an engaging position with said fruit while being rotated, moving said blade axially of said fruit at a varying rate corresponding to the shape of said plant when being rotated at the selected speed to substantially uniformly pare said fruit, releasing the blossom end of said fruit so that the fruit is supported only at the stem end, ejecting said fruit from the spike member supporting it at the stem end.

2. Apparatus for paring an eggplant having blossom end and stem end comprising, in combination, means rotatably supporting said blossom end, means more firmly supporting said stem end than said bottom end and capable of supporting said stem end, both of said supporting means coacting to rotatably support said eggplant on a first axis extending through the blossom and stem ends thereof, means rotating said stem end supporting means at a selected speed, a paring blade, means maintaining said blade in an engaged position with said eggplant, means controlling the cutting depth of said blade and control means moving said blade maintaining means substantially parallel to said axis at a varying rate of speed corresponding to the shape of said eggplant when being rotated at the selected speed to substantially uniformly spirally pare said eggplant.

3. Apparatus for paring an eggplant having blossom and stem ends comprising, in combination, a first spike member upon which the blossom end of said eggplant is impaled, a retractable second spike member upon which the stem end of said eggplant is impaled, said spike members being axially aligned to rotatably support said eggplant on a first axis extending through the blossom and stem ends thereof, means rotating said second spike member at a selected speed, means retracting said second spike member and for retaining said eggplant thereon when being retracted from said first spike member, a paring blade, means maintaining said blade in an engaged position with said eggplant, means controlling the cutting depth of said blade and means moving said blade substantially horizontally of said eggplant at a varying rate corresponding to the shape of said eggplant when being rotated at the selected speed to substantially uniformly spirally pare said eggplant.

4. Apparatus in accordance with claim 3 including means ejecting said eggplant from said second spike member only after said eggplant has been freed from said first spike member by said retracting means.

5. Apparatus in accordance with claim 4 in which said ejecting means comprises a collar mounted to slide relative to said second spike member and means reciprocating said collar longitudinally of said second spike member.

6. Apparatus in accordance with claim 3 in which said blade moving means includes a cam having a portion of its periphery being a curve generated about a point rotating at the selected rate of speed at which the eggplant is rotated, said curve terminating at a point measured radially from a starting point a distance equal to at least the length of the axis of a typical eggplant, said curve being generated by the variable rate of lineal travel said blade makes while moving at a selected uniform rate of travel over the surface of a typical eggplant from one of said ends to the other of said ends.

7. Apparatus for paring fruit comprising, in combination, means axially supporting said fruit, means rotating said supporting means at a selected speed, a paring blade, means maintaining said blade in an engaged position with said fruit and for moving said blade axially of said fruit, means controlling the cutting depth of said blade, the cutting edge of said blade having at least one end disposed substantially normal to the cutting edge of said blade and away from the fruit thereby to free the peeled portion from the fruit.

8. Apparatus for paring fruit comprising, in combination, means axially supporting said fruit, means rotating said supporting means at a selected speed, a paring blade, means maintaining said blade in an engaged position with said fruit and for moving said blade axially of said fruit, means controlling the cutting depth of said blade, the cutting edge of said blade having a configuration with a leading edge and a trailing edge angularly disposed to axis of rotation, and at least the trailing edge disposed substantially normal to the cutting edge of said blade.

9. Apparatus for paring an eggplant or the like comprising, in combination: means rotatably supporting said eggplant along an axis extending through the blossom and stem ends thereof, means rotating said supporting means at a selected speed, a paring blade, means maintaining said blade in an engaged position with said eggplant for maintaining a selected cutting depth for the blade, and means moving said blade maintaining means substantially axially of said eggplant at a varying rate corresponding to the shape of said eggplant including a cam having a portion of its periphery being a curve generated about a point rotating at the selected speed at which the eggplant is rotated, said curve terminating at a point measured radially from the starting point of said curve a distance equal to at least the length of the axis of a typical eggplant, said curve being generated by the variable rate of lineal travel said blade makes while moving at a selected uniform rate of travel over the surface of a typical eggplant from one of said ends to the other of said ends, thereby to substantially uniformly spirally pare said eggplant.

10. Apparatus for paring an eggplant or the like comprising, in combination, means rotatably supporting said eggplant or the like along an axis extending through the blossom and stem ends thereof, including a pair of axially aligned spike members having a plurality of radially spaced spikes adapted to be received internally thereof, means rotating said supporting means at a selected speed, a paring blade, means maintaining said blade in an engaged position with said eggplant and for maintaining a selected cutting depth for the blade, and means moving said blade maintaining means substantially axially of said eggplant at a varying rate corresponding to the shape of said eggplant when being rotated at the selected speed to substantially uniformly spirally pare said eggplant, and means removing the support means from a first of said eggplant ends and means retaining the other end of said eggplant on said support means while removing the support means from said first end.

11. Apparatus in accordance with claim 10 including means ejecting said eggplant from said support means after said support means have been removed from said first eggplant end.

12. Apparatus for paring an eggplant or the like comprising, in combination, means rotatably supporting said eggplant or the like along an axis extending through the blossom and stem ends thereof, including a pair of axially aligned spike members having a plurality of radially spaced spikes adapted to be received internally thereof, means rotating said supporting means at a selected speed, a paring blade, means maintaining said blade in an engaged position with said eggplant and for maintaining a selected cutting depth for the blade, and means moving said blade maintaining means substantially axially of said eggplant at a varying rate corresponding to the shape of said eggplant when being rotated at the selected speed to substantially uniformly spirally pare said eggplant, said blade moving means includes a cam having a portion of its periphery being a curve generated about a point rotating at the selected speed at which the eggplant is rotated, said curve terminating at a point measured radially from the starting point of said curve a distance equal to at least the length of the axis of a typical eggplant, said curve being generated by the variable rate of lineal travel said blade makes while moving at a selected uniform rate of travel over the surface of a typical eggplant from one of said ends to the other of said ends.

13. A method for paring an eggplant or the like having blossom and stem ends comprising the steps of rotatably supporting said blossom end, more firmly supporting said stem end than said blossom end and rotating said stem end to coactively impart rotation of the entire eggplant or the like, maintaining a blade in an engaged position with said eggplant while being rotated, and controlling the cutting depth of said blade and moving said blade substantially parallel to the rotational axis of the eggplant at a varying rate of speed corresponding to the shape of the eggplant when being rotated at the selected speed to substantially uniformly spirally pare said eggplant, and releasing the blossom end of said fruit so that the fruit is solely supported at the stem end.

14. Apparatus for paring an eggplant or the like comprising, in combination, a means rotatably supporting said eggplant or the like along an axis extending through the blossom and stem ends thereof, including a pair of axially aligned spike members having a plurality of radially spaced spikes adapted to be received internally thereof, one of said spike members having spikes of sufficient length to solely support said eggplant when the stem end thereof receives said spikes, means rotating said supporting means at a selected speed, a paring blade, means maintaining said blade in an engaged position with said eggplant and for maintaining a selected cutting depth for the blade, and means moving said blade maintaining means substantially axially of said eggplant at a varying rate corresponding to the shape of said eggplant when being rotated at the selected speed to substantially uniformly spirally pare said eggplant.

15. Apparatus for paring an eggplant or the like comprising, in combination, means rotatably supporting said eggplant or the like along an axis extending through the blossom and stem ends thereof, including a pair of axially aligned spike members, one said member having a plurality of radially spaced spikes adapted to be received internally thereof, means rotating said supporting means at a selected speed, a paring blade, means maintaining said blade in an engaged position with said eggplant and for maintaining a selected cutting depth for the blade, and means moving said blade maintaining means substantially axially of said eggplant at a varying rate corresponding to the shape of said eggplant when being rotated at the selected speed to substantially uniformly spirally pare said eggplant and means removing the support means from a first of said eggplant ends and means retaining the other end of said eggplant on said support means while removing the support means from said first end.

16. Apparatus in accordance with claim 15 including means ejecting said eggplant from said support means after said support means has been removed from said first eggplant end.

17. Apparatus for paring an eggplant or the like comprising, in combination, means rotatably supporting said eggplant or the like along an axis extending through the blossom and stem ends thereof, including a pair of axially aligned spike members having a plurality of radially spaced spikes adapted to be received internally thereof, one of said spike members is axially pivotable between an operative and an inoperative position, means rotating said supporting means at a selected speed, a paring blade, means maintaining said blade in an engaged position with said eggplant and for maintaining a selected cutting depth for the blade, and means moving said blade maintaining means substantially axially of said eggplant at a varying rate corresponding to the shape of said eggplant when being rotated at the selected speed to substantially uniformly spirally pare said eggplant.

18. Apparatus for paring an eggplant having blossom and stem ends comprising, in combination, means rotatably supporting said blossom end, means more firmly supporting said stem end than said blossom end, both of said supporting means coacting to rotatably support said eggplant on a first axis extending through the blossom and stem ends thereof, means rotating said stem end supporting means at a selected speed, said supporting means rotatably supports said eggplant along a horizontal axis, and said control means comprises, a cam rotatable in a vertical plane parallel to said horizontal axis and a cam follower responsive to said cam and movable along a horizontal path, said cam follower carrying said blade and blade maintaining means, a paring blade, means maintaining said blade in an engaged position with said eggplant, means controlling the cutting depth of said blade and control means moving said blade maintaining means substantially parallel to said axis at a varying rate of speed corresponding to the shape of said eggplant when being rotated at the selected speed to substantially uniformly spirally pare said eggplant.

19. Apparatus in accordance with claim 18 including switch means responsive to said cam for electrically controlling said cam and rotating means.

References Cited by the Examiner

UNITED STATES PATENTS

| | | | |
|---|---|---|---|
| 707,700 | 8/02 | Jacobs | 146—39 |
| 1,872,731 | 8/32 | Goranson et al. | 146—43 |
| 2,089,502 | 8/37 | Polk. | |
| 2,178,889 | 11/39 | Garieau | 146—43 |
| 2,664,129 | 12/53 | Coons | 146—43 X |
| 2,860,676 | 11/58 | Coons et al. | 146—43 |
| 2,975,813 | 3/61 | Freeman et al. | 146—43 |

J. SPENCER OVERHOLSER, *Primary Examiner.*